(12) United States Patent
Dry et al.

(10) Patent No.: US 10,166,703 B2
(45) Date of Patent: *Jan. 1, 2019

(54) ELASTOMERIC GASKET WITH MULTIPLE SKELETONS FOR PLACEMENT BETWEEN TWO PARTS OF AN AIRCRAFT AND A METHOD FOR MAKING THE SAME

(71) Applicant: THE PATENT WELL LLC, Fort Worth, TX (US)

(72) Inventors: Michael Dry, Fort Worth, TX (US); Matt Boyd, Fort Worth, TX (US); Kent Boomer, Aledo, TX (US); Jeff Busby, Millsap, TX (US)

(73) Assignee: THE PATENT WELL LLC, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/666,960

(22) Filed: Aug. 2, 2017

(65) Prior Publication Data

US 2017/0326762 A1    Nov. 16, 2017

Related U.S. Application Data

(63) Continuation of application No. 15/085,389, filed on Mar. 30, 2016, now Pat. No. 9,751,244, which is a
(Continued)

(51) Int. Cl.
*F16J 15/08*     (2006.01)
*B29C 43/56*     (2006.01)
(Continued)

(52) U.S. Cl.
CPC ............ *B29C 43/56* (2013.01); *B29C 43/203* (2013.01); *B64D 37/32* (2013.01); *B64D 47/00* (2013.01);
(Continued)

(58) Field of Classification Search
CPC .. F16J 15/10; F16J 15/102; F16J 15/12; F16J 15/121; F16J 15/122; B29C 43/56;
(Continued)

(56) References Cited

U.S. PATENT DOCUMENTS 1,851,948 A     3/1932   Summers
2,092,393 A     9/1937   Hewitt
(Continued)

FOREIGN PATENT DOCUMENTS

EP          2166219 B1     6/2012
JP         09109346 A      4/1997
(Continued)

OTHER PUBLICATIONS

"Conductive Elastomer Gasket Design," Chomerics, www.chomerics.com, pp. 1-9 Jan. 1, 2011.
(Continued)

*Primary Examiner* — Gilbert Y Lee
(74) *Attorney, Agent, or Firm* — Jackson Walker, LLP

(57) ABSTRACT

An assembly for use on an aircraft wing having an aircraft skin and a fuel tank, the assembly comprising a metal access door for accessing the fuel tank, a metal retainer ring for engaging the wing and the access door. Fasteners removably couple the access door to the retainer ring. A lip, which may be on the wing surface, is configured to receive a perimeter of the access door when the access door is coupled to the retainer ring. A polyurethane elastomeric gel gasket having a metallic skeleton is configured to lay between the access door and a lip of the metal wing surface. Under compression, the polyurethane will deform and squeeze out the edges and flatten so as to provide metal-to-metal contact between the access door and the lip.

20 Claims, 7 Drawing Sheets

Related U.S. Application Data continuation-in-part of application No. 13/788,583, filed on Mar. 7, 2013, now Pat. No. 9,303,447.

(60) Provisional application No. 61/647,149, filed on May 15, 2012.

(51) Int. Cl.
    *B64D 37/32*     (2006.01)
    *B64D 47/00*     (2006.01)
    *B29C 43/20*     (2006.01)
    *F16J 15/12*     (2006.01)
    *B29K 305/00*    (2006.01)
    *B29K 75/00*     (2006.01)
    *B29L 9/00*      (2006.01)
    *B29L 31/26*     (2006.01)

(52) U.S. Cl.
CPC ....... *F16J 15/126* (2013.01); *B29C 2043/561* (2013.01); *B29K 2075/00* (2013.01); *B29K 2305/00* (2013.01); *B29L 2009/003* (2013.01); *B29L 2031/265* (2013.01)

(58) Field of Classification Search
CPC . B29C 43/203; B29C 2043/561; B64D 37/32; B64D 47/00; B29K 2075/00; B29K 2305/00; B29L 2009/003; B29L 2031/265
See application file for complete search history.

(56) References Cited

U.S. PATENT DOCUMENTS

| | | | |
|---|---|---|---|
| 3,126,440 A | 3/1964 | Goodloe |
| 3,473,813 A | 10/1969 | Meyers |
| 3,532,349 A | 10/1970 | Czernik |
| 3,542,939 A | 11/1970 | Mintz |
| 3,555,168 A | 1/1971 | Frykberg |
| 3,610,809 A | 10/1971 | Eigenbrod |
| 3,681,272 A | 8/1972 | Gloskey |
| 3,993,833 A | 11/1976 | Esmay |
| 4,037,009 A | 7/1977 | Severinsen |
| 4,090,988 A | 5/1978 | Babiec |
| 4,183,699 A | 1/1980 | Donan |
| 4,305,696 A | 12/1981 | Pask |
| 4,325,280 A | 4/1982 | Hardy |
| 4,530,443 A | 7/1985 | Gorges |
| 4,544,169 A | 10/1985 | Cobb |
| 4,579,248 A | 4/1986 | Gorges |
| 4,635,949 A | 1/1987 | Lucas |
| 4,835,060 A | 5/1989 | Kosiarski |
| 4,900,629 A | 2/1990 | Pitolaj |
| 4,900,877 A | 2/1990 | Dubrow |
| RE33,392 E | 10/1990 | Brauer |
| 5,037,879 A | 8/1991 | Roberts |
| 5,158,638 A | 10/1992 | Osanami |
| 5,512,709 A | 4/1996 | Jencks et al. |
| 5,702,111 A | 12/1997 | Smith |
| 5,791,654 A | 8/1998 | Gaines et al. |
| 5,890,719 A | 4/1999 | Bettencourt |
| 5,910,524 A | 6/1999 | Kalinoski |
| 5,929,138 A | 7/1999 | Mercer et al. |
| 6,056,526 A | 5/2000 | Sato |
| 6,093,467 A | 7/2000 | Forry |
| 6,121,545 A | 9/2000 | Peng |
| 6,312,022 B1 | 11/2001 | Brophy, III et al. |
| 6,346,330 B1 | 2/2002 | Huang et al. |
| 6,364,976 B2 | 4/2002 | Fletemier |
| 6,365,812 B1 | 4/2002 | McGill |
| 6,403,226 B1 | 6/2002 | Biernath et al. |
| 6,460,859 B1 | 10/2002 | Hammi et al. |
| 6,530,577 B1 | 3/2003 | Busby |
| 6,536,775 B1 | 3/2003 | Inciong |
| 6,553,664 B1 | 4/2003 | Schenk |
| 6,598,883 B1 | 7/2003 | Hammi et al. |
| 6,695,320 B2 | 2/2004 | Busby |
| 6,761,360 B2 | 7/2004 | Hammi |
| 7,229,516 B2 | 1/2007 | Busby |
| 7,290,769 B2 | 11/2007 | Piona |
| 7,314,898 B2 | 1/2008 | Downing, Jr. et al. |
| 7,654,538 B2 | 2/2010 | Oka |
| 8,240,040 B2 | 8/2012 | Miyamoto et al. |
| 8,759,692 B2 | 6/2014 | Bunyan et al. |
| 8,766,108 B2 | 7/2014 | Bunyan et al. |
| 2002/0063397 A1 | 5/2002 | Gaines et al. |
| 2002/0135137 A1 | 9/2002 | Hammi |
| 2004/0041356 A1 | 3/2004 | Smith et al. |
| 2004/0070156 A1 | 4/2004 | Smith |
| 2005/0023768 A1 | 2/2005 | Adams |
| 2009/0322040 A1 | 12/2009 | Banba |
| 2010/0258200 A1 | 10/2010 | Walker |
| 2011/0156353 A1 | 6/2011 | Kabutoya et al. |
| 2011/0227295 A1 | 9/2011 | Watanabe et al. |
| 2013/0091864 A1 | 4/2013 | Auzelyte et al. |
| 2013/0273342 A1 | 10/2013 | Johnson et al. |
| 2014/0334868 A1 | 11/2014 | Apfel |
| 2016/0176497 A1 | 6/2016 | Coppola et al. |

FOREIGN PATENT DOCUMENTS

| | | |
|---|---|---|
| WO | 1994006171 | 12/1994 |
| WO | 2005030893 | 9/2004 |

OTHER PUBLICATIONS

"Technical Data Sheet," PN# 1500101130CR, VTT/Shieldex Trading USA, www.shieldextrading.net/product_INDEX.html, 9 pages Jan. 20, 2010.

Tecknit. EMI Shielding Products, Mesh & Elastomer Combination Gaskets, www.tecknit.com/meshelas.html Aug. 31, 2012.

Tecknit, EMI Shielding Products, Oriented Wire Mesh Strip & Gasket Material, www.tecknit.com/orient.html Aug. 31, 2012.

Tecknit, EMI Shielding Products, Conductive Silicone Elastomers, www.tecknit.com/silelast.html Aug. 31, 2012.

Loos & Co., Inc., Knitted Wire Mesh, www.loosco.com/index.php?page=knitted-wire-mesh, 3 pages Dec. 7, 2012.

Chomerics, Parker Hannifin, FAA-PMA, P/N: 15-20201, two unpublished photographs of a fuel access door panel gasket with label for an aircraft fuel access panel at door Date of manufacture believed to be about Sep. 1, 2010. Sep. 1, 2010.

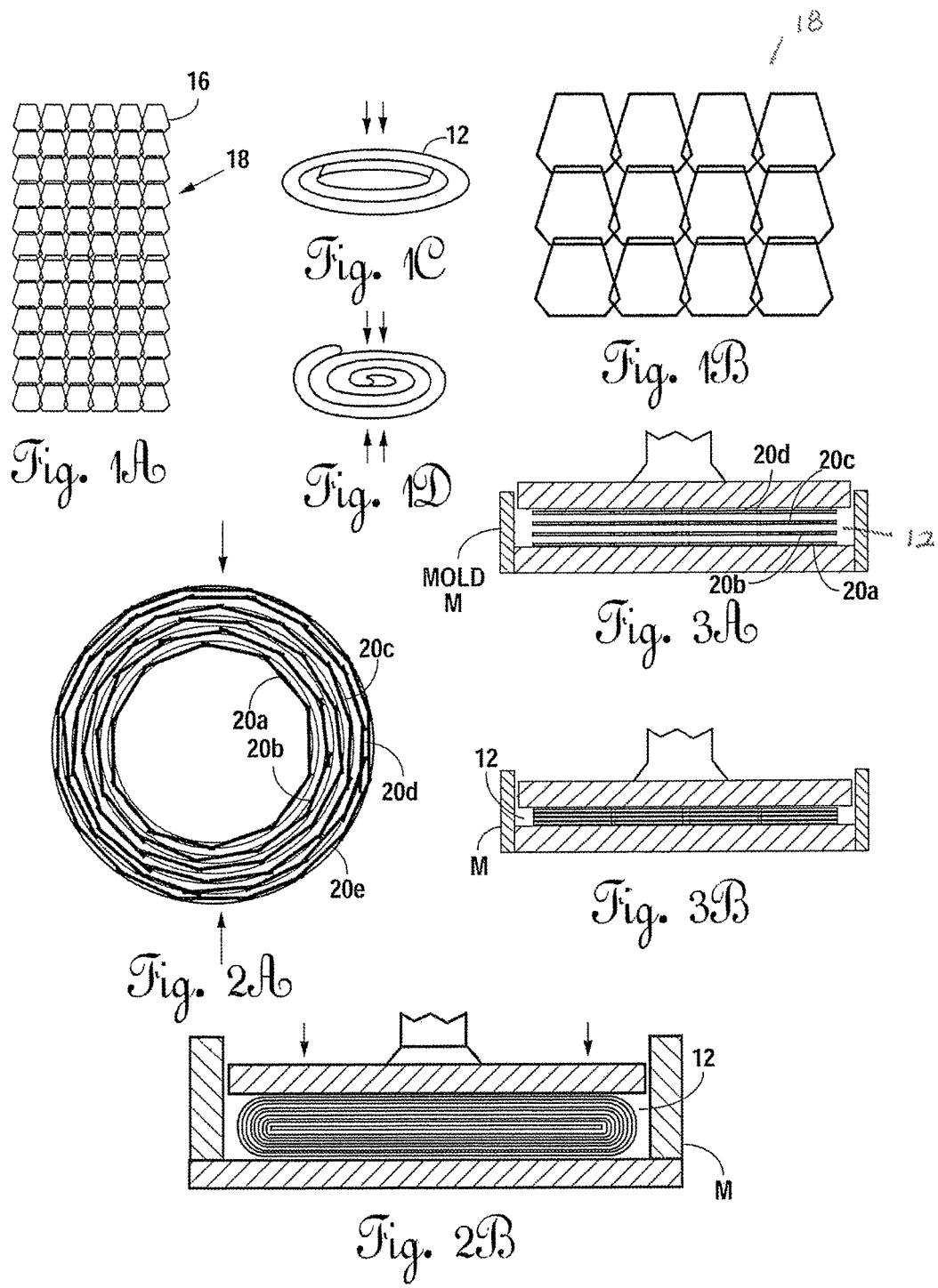

ELASTOMERIC GASKET WITH MULTIPLE SKELETONS FOR PLACEMENT BETWEEN TWO PARTS OF AN AIRCRAFT AND A METHOD FOR MAKING THE SAME

This continuation application claims priority to, the benefit of, and incorporates herein by reference U.S. application Ser. No. 15/085,389, filed Mar. 30, 2016; U.S. application Ser. No. 13/788,583, filed Mar. 7, 2013; which claims priority to, the benefit of, and incorporates herein by reference U.S. Provisional Application Ser. No. 61/647,149, filed May 15, 2012.

FIELD OF THE INVENTION

Gaskets, more specifically, compressed, impregnated gaskets for the fuel access door of an aircraft.

BACKGROUND OF THE INVENTION

A fuel door is typically located on the upper portion of the wing of an aircraft. Removal of fasteners allows removal of the door. Removal of the door provides the ability to access to the fuel tank. The door is removably attached, sealing compressively against a door ring having "O" rings (see FIG. 13). The door retainer ring is urged up against the underside of a perimeter portion of the door or an opposed mating wall, stationary on the wing is provided. A gasket is provided between the inner-facing wall on the door and the opposed wall on the wing. These gaskets are typically conductive in nature.

SUMMARY OF THE INVENTION

Applicants provide a unique electrical conductive gasket configured for use between a fuel door of a winged aircraft and the aircraft, to provide a conductive seal with favorable environmental sealing properties, for example, sealing against the passage of fluids therepast.

A gasket for use with a fuel access door having a generally flat inner facing mating wall and having an outer perimeter and an opposed generally flat outward facing mating wall having an inner perimeter on a wing of an aircraft, the fuel access door adapted to be removably fastened to the wing, the gasket comprising a porous, partially open metallic skeleton being generally tabular in nature and generally ring shaped, the skeleton having a generally flat upper surface and a generally flat lower surface, an inner perimeter wall and an outer perimeter wall; and a pliable, resilient, elastomeric, sticky, substantially air bubble free polyurethane, coherent body, substantially filling the openings of the skeleton and being generally tabular in nature, the body being ring shaped having a generally flat, tacky upper surface, a generally flat, tacky lower surface, an inner perimeter wall, and an outer perimeter wall; wherein the inner perimeter walls of both the skeleton and the body generally conform to the shape defined by the inner perimeter of the outward facing wall and wherein the outer perimeter walls of both the skeleton and the body generally conform to the shape defined by the outer perimeter of the fuel access door; and wherein the gasket is adapted to lay between the inner facing mating wall member and the outward facing mating wall member.

A method of making a gasket for use with a generally flat inner facing mating wall having an outer perimeter of a fuel access door and an opposed generally flat outward facing mating wall having an inner perimeter of a wing of an aircraft, the method comprising the steps of providing a mold to receive the skeleton therein; pouring a pre-cured polyurethane mix in the mold to substantially cover the skeleton; removing air from the polyurethane mix; and allowing the polyurethane mix to cure.

BRIEF DESCRIPTION OF THE DRAWINGS

FIGS. 1A and 1B are illustrations of the knitted, woven metallic fabric that may be used in creation of the gasket or embodiments thereof as set forth herein.

FIGS. 1C and 1D illustrate a concentric configuration and spiral configuration of the metallic woven and/or knitted fabric as set forth herein.

FIGS. 2A and 2B illustrate pre-compression and post-compression views of the skeleton in concentric configuration.

FIGS. 3A and 3B illustrate views of a skeleton having a layered fabric configuration, pre-compression and post-compression.

DETAILED DESCRIPTION OF THE PREFERRED EMBODIMENT

Figure 4A:
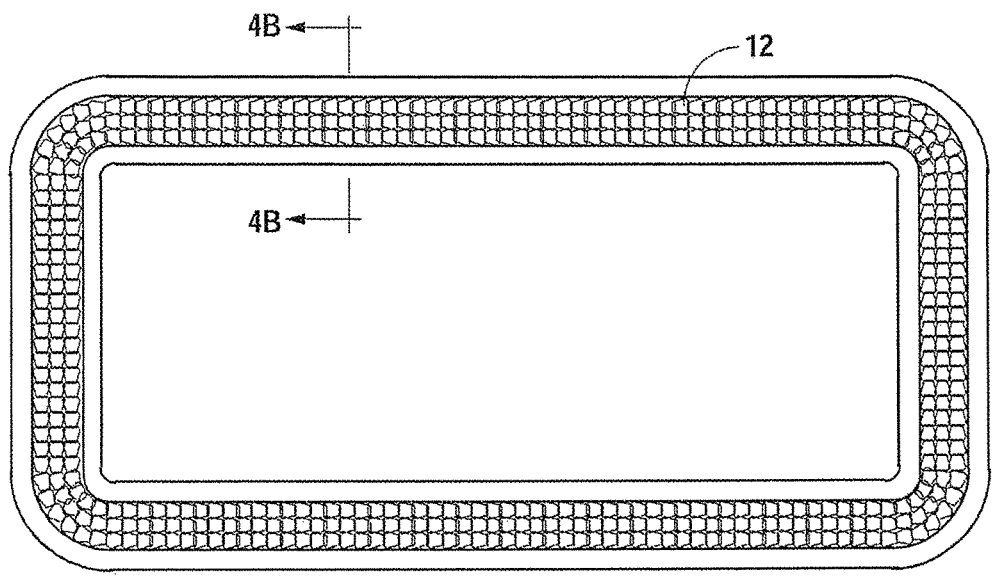
FIGS. 4A, 4B, 4C, and 4D illustrate a method of manufacturing an embodiment of the gel impregnated gasket as describe and disclosed herein.

This application incorporates by reference, U.S. Pat. Nos. 6,530,577; 6,695,320; and 7,229,516.

Applicants provide for a gasket 10 that is comprised of a pliable metallic conductive skeleton 12 and an elastomer body 14, such as a polyurethane. The polyurethane may be the polyurethane set forth in U.S. Pat. Nos. 6,530,577; 6,695,320; and 7,229,516, incorporated herein by reference.

Strands 16 of a conductor, such as a fine gauge steel, may be woven, in one embodiment, into a knitted or sheet-like metallic fabric 18. The fabric may be folded, rolled, layered or stacked to create a multi-ply skeleton 12, which may, in one embodiment, be compressed (see FIGS. 2A, 2B, 3A, 3B) and then soaked or impregnated in any suitable way, such as pouring or applying as shown in FIG. 4C, with a pre-cured elastomer. The elastomer and skeleton may be subject to the removal of any trapped air bubbles 23 (see FIG. 4C) in a pre-cured condition, and then allowed to cure. Polyurethane, such as set forth in the patents incorporated by reference may be used for the elastomer, gel body. In one embodiment, multiple skeletal layers 20a-20e are seen, which layers may be concentric (FIGS. 10, 2A, and 2B), spirally wound, tabular (FIG. 1D), (that is, separate layers, see FIG. 3A), and together, may be compressed (before adding the mix) under pressure either within (see FIG. 3A, for example) or without a mold.

In one embodiment, pressure is applied to the skeleton to both compress and shape the metallic skeleton. Pressure is typically sufficient to give a set to the metal comprising the skeleton. Thereafter, mix is applied and the mix is allowed to settle, is compressed, or is vacuum drawn into the gasket, after which it is allowed to cure.

The gasket is typically configured to lie between a fuel door and fuselage of an aircraft or any other suitable location under compression. Typically, some squeeze-out and/or deformation of the elastomer 14 occurs with contact and compression between the fuel door, the skeleton, and the fuselage to ensure conductivity and a good environmental seal between the same (see FIG. 13).

FIGS. 1A and 1B are illustrations of a knitted and/or woven metallic fabric that may be used in creation of one embodiment of the gasket or embodiments thereof as set forth herein. The interlocked loop structure is illustrated. This material is available from Metex Corp., of Edison, N.J. (see "metexcorp.com").

FIGS. 1C and 1D illustrate concentric configurations and spiral configurations, respectfully, of the metallic woven and/or knitted fabric or other suitable at least partially open metal skeleton as set forth herein. FIGS. 2A and 2B illustrate pre-compression and post-compression views of the skeleton in multiple concentric configurations when skeletal compression (before adding mix) is used. FIGS. 3A and 3B illustrate views of a skeleton having a layered fabric configuration, pre-compression and post-compression. The pre-impregnation skeleton shape has been formed and configured to seal between the door retainer lip and the access door as seen in FIG. 13.

Figure 13:
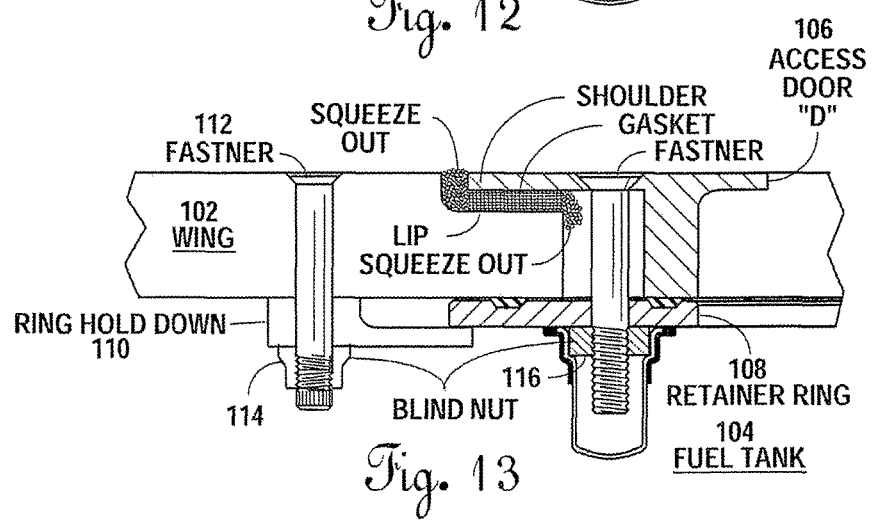

Thus, it is seen with respect to FIGS. 1A-1D, that a skeleton, in one embodiment having a knitted interlocking loop metallic fabric structure may be provided in a number of configurations and compressed into a shape suitable for laying between a fuel access door as seen in FIG. 13, and a mating face for compression therebetween.

Figure 4B:
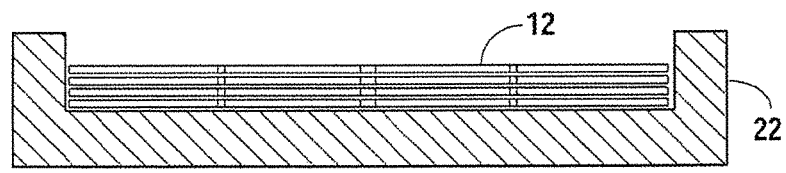
Figure 4C:
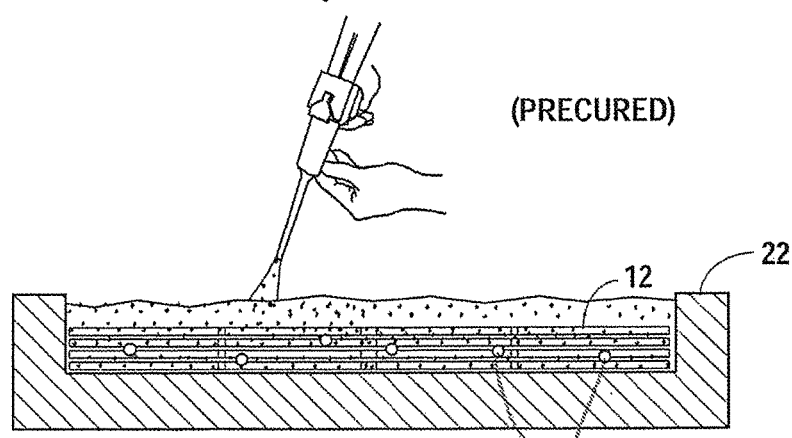
Figure 4D:
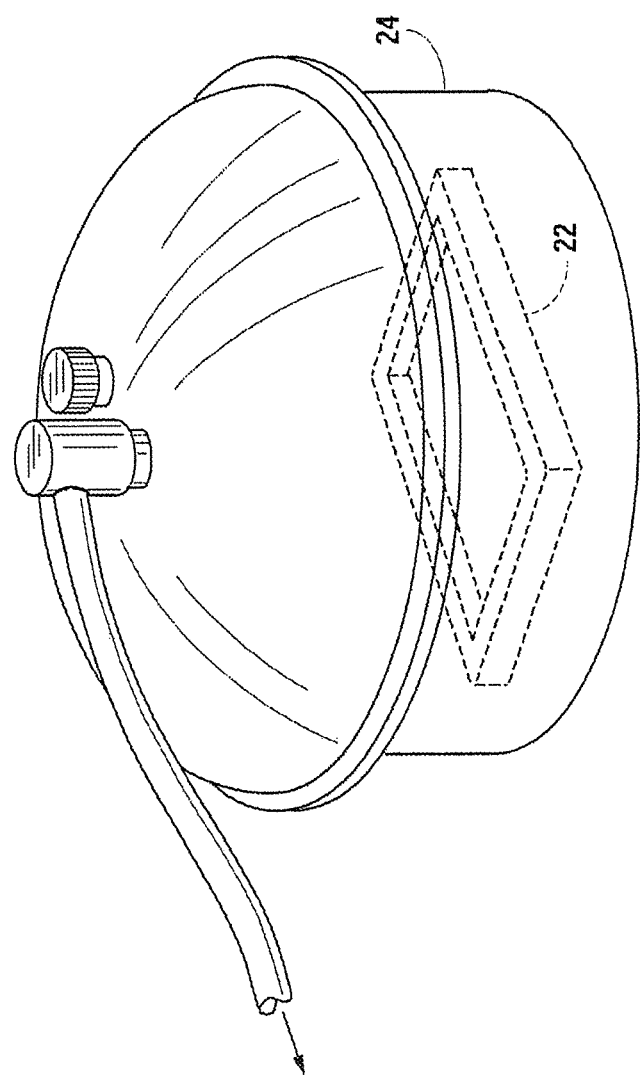
Figure 6:
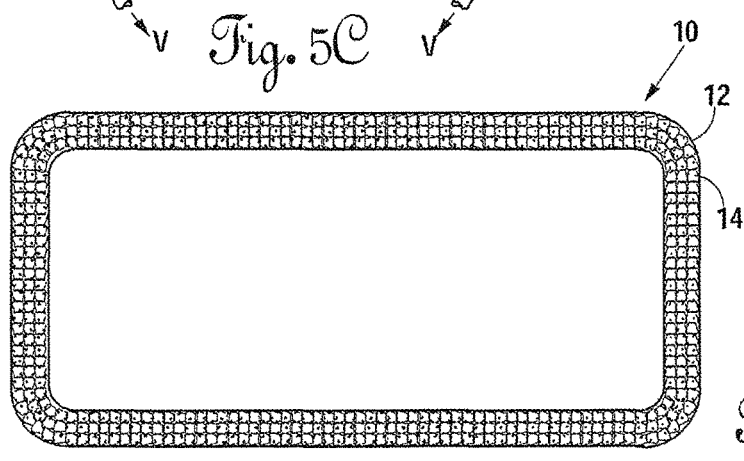
FIG. 6 illustrates a gasket according to one embodiment of the invention configured for placement between a fuel access door and a fuel access door retaining ring of a wing of an aircraft.
Figure 12:
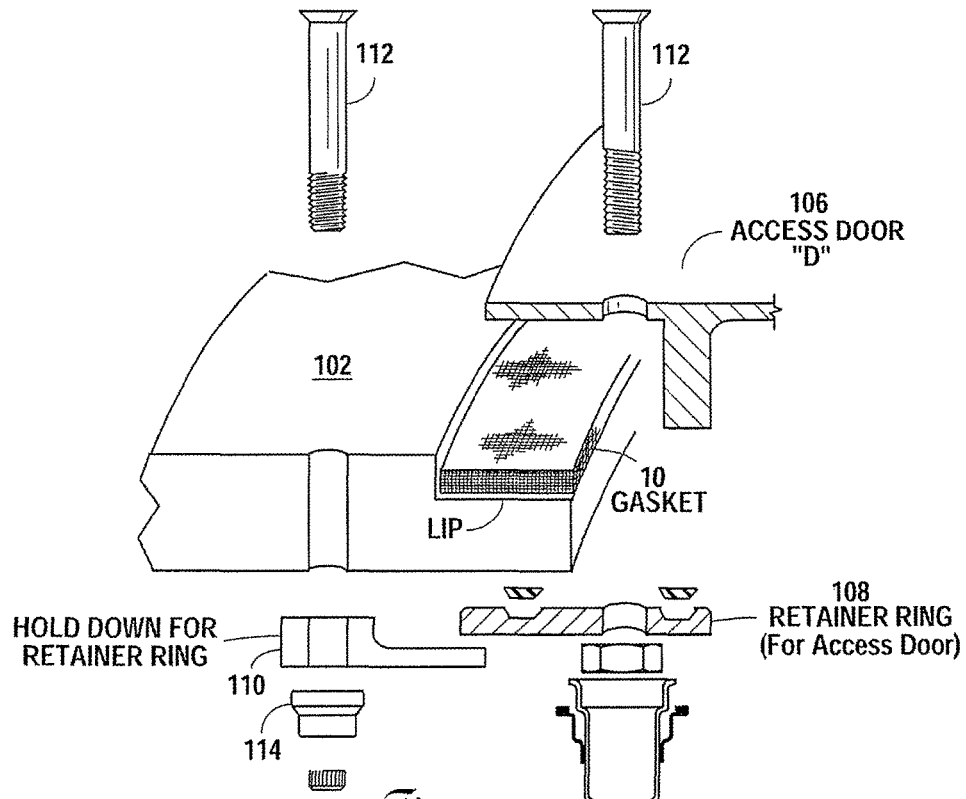

FIGS. 4A, 4B, 4C, and 4D illustrate a method of manufacturing an embodiment of the gasket as describe and disclosed herein. FIGS. 4A and 4B illustrate that a skeleton 12 may be configured in a number of ways, including compression in a mold shaped to reflect the contact area between the lip and the access door as illustrated in FIGS. 12 and 13. FIG. 4B illustrates laying the skeleton in a first container and then applying a two-part polyurethane mix as set forth in U.S. Pat. Nos. 6,530,577; 6,695,320; and 7,229,516, incorporated herein by reference. The skeleton, soaked with pre-cured mix in the first container as seen in FIG. 4C may be placed in a vacuum container 24 as seen in FIG. 4D and the vacuum drawn as set forth herein. FIG. 6 illustrates the gasket 10 after air bubbles are removed from the polyurethane mix.

In FIG. 4D, a method of forming an gasket as set forth herein is disclosed. What is seen is a pump drawing a vacuum on a vacuum chamber or container with a dome on it, capable of generating a vacuum. A skeleton is placed in a first container and then completely covered, typically by at least a ¼ inch of pre-cured polyurethane mix extending above the skeleton (see, for example, FIGS. 4B and 4C). A preferred mix has the consistency and viscosity of about 50 weight motor oil.

The first container is then placed inside the vacuum chamber and a vacuum is run. While the vacuum is being run, observation allows one to see the air bubbling out of the covered gasket. When the gas stops bubbling out of the covered gasket, the first container is removed from the vacuum chamber (following a return to ambient pressure). After the mix has cured, the gel body is substantially without air bubbles and the skeleton is substantially saturated with the cured polyurethane elastomer.

Figure 5A:
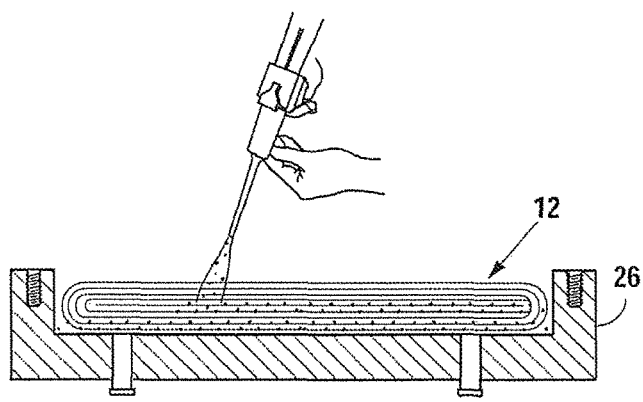
FIGS. 5A, 5B, and 5C illustrate a method of manufacturing embodiment of the gasket disclosed herein utilizing a vacuum drawn following application of a pre-cured mix.
Figure 5B:
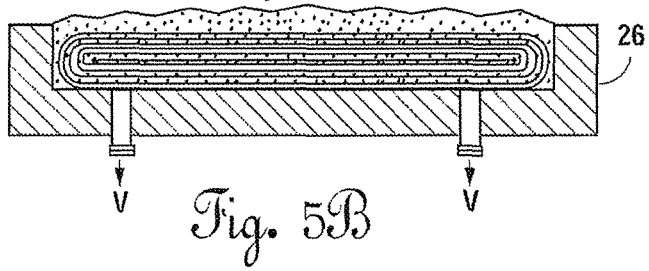
Figure 5C:
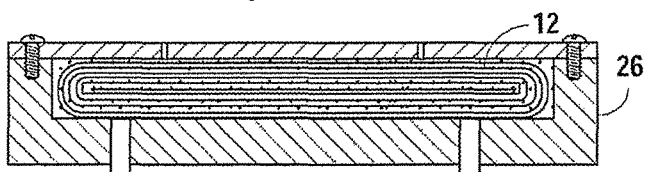

FIGS. 5A, 5B, and 5C show an alternate method of manufacturing and indicate that a modified container 26 be sealed and a vacuum drawn thereupon to remove the air therefrom.

Figure 7:
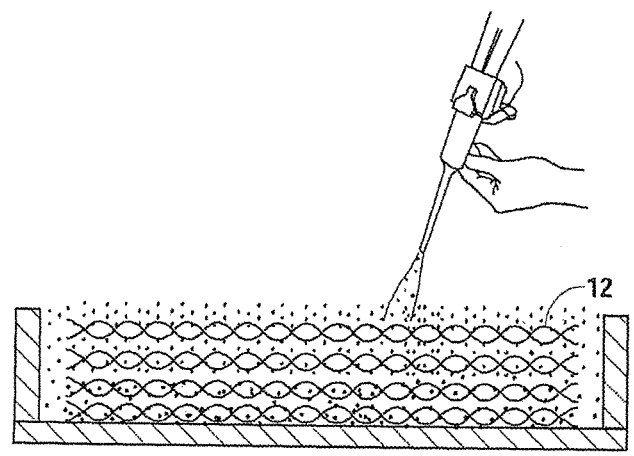
FIGS. 7, 8 and 9 illustrate an alternate preferred embodiment of a gel impregnated gasket utilizing woven mesh, which mesh is first compressed and then impregnated (soaked) in premix.
Figure 8:
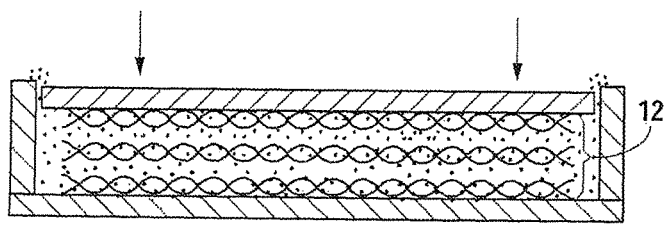
Figure 9:
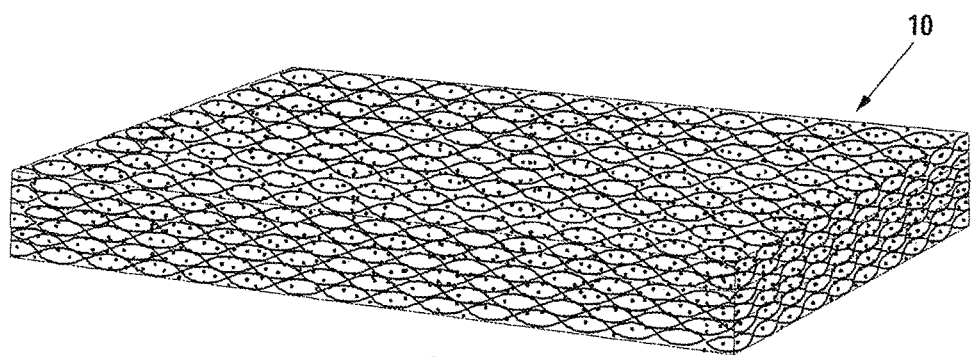

FIGS. 7, 8 and 9 illustrate an alternate preferred method of making a gasket utilizing woven fabric, such as aluminum mesh. In FIG. 7, a multiply woven metallic mesh, such as the metallic skeleton disclosed in the patents incorporated herein by reference, is soaked in pre-cure. The skeleton may be precut to the gasket shape in single or multiple sheets, laid together and soaked. Following soaking and before curing, FIG. 8 illustrates the addition of pressure or compression. The compression may help remove any air bubbles and also help bring skeletal layers of a multi-ply embodiment closer together. It will typically generate some squeeze out (see FIG. 8).

Figure 10:
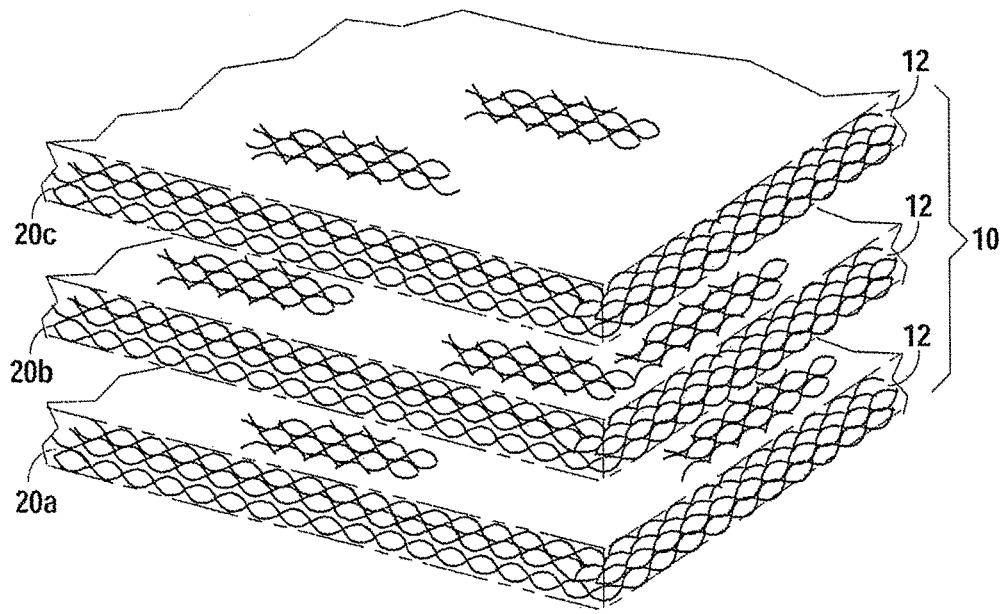
FIG. 10 illustrates an alternate preferred embodiment of Applicants' gasket using multiple, preformed, cured, gel bodied gaskets having a single or multiple skeletons therein.
Figure 11:
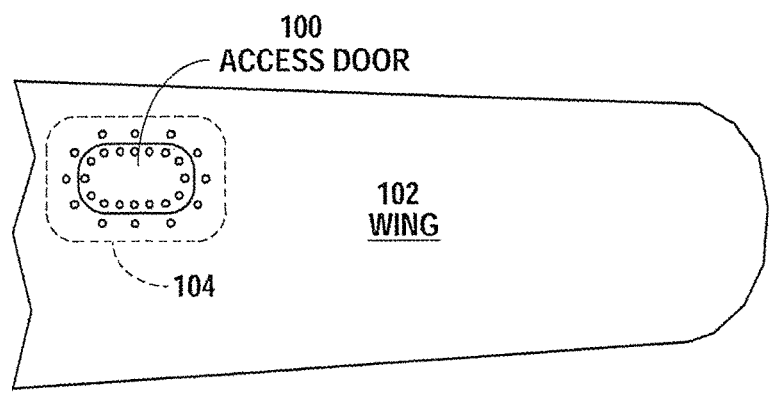
FIGS. 11, 12, and 13 illustrate a preferred environment in which Applicants' gasket may be used.

FIG. 10 illustrates an alternate preferred embodiment of Applicants' gasket using multiple gaskets having a single or multiple skeletons therein. FIG. 10 illustrates the gaskets with metallic skeletons that are disclosed in the patents incorporated by reference herein. They are die cut or cut by other means to reflect the shape for use between an access door and the lip (see FIGS. 12 and 13). They are then, already cured, stacked as seen in FIG. 10 and may be compressed. Stacking will effect a sticking of one to the other. They may then be compressed when they are placed between the access door and the wing. In any case, compression will be sufficient to provide metal-to-metal contact between the access door and the lip.

Applicants' pre-cured polyurethane mix will when cured produces a gasket suitable for use in the environment set forth herein. This gasket will leave no silicon residue and is removable and reusable. The skeleton in the elastomer is molded and shaped to reflect substantially full coverage flat and adjacent to the underside of the shoulder of the access door D as seen in FIGS. 12 and 13 and the top side or upper surface of the lip. As can be seen in FIGS. 12 and 13, these two surfaces are parallel and spaced apart and, thus the gasket is typically tabular to provide, under compression, substantially full coverage with some squeeze-out of elastomer at the edges as seen in FIG. 13.

It is seen that Applicants' method of making the aircraft gasket typically includes a vacuum step for removing any air bubbles that may have accumulated or become entrained in the mix in the process of adding the liquid mix to the skeleton. Moreover, it is seen that the vacuum step may be achieved by applying a vacuum to the mold as seen in FIGS. 5A-5C. On the other hand, the vacuum step may be achieved by placing the entire mold with the pre-cured gel poured on the skeleton, to the inside of a vacuum chamber, and drawing a vacuum on the chamber as seen in FIG. 4D. In both cases, in a few minutes, any bubbles should be cleared from the mix, which can be confirmed, if desired, visually. Typically, the vacuum is then removed and the gel allowed to cure. This may be 30 minutes to one and a half hours, or any other suitable time.

It is seen that the skeleton is typically comprised of at least one metallic layer and is more typically comprised of multiple metallic layers. It is seen that there may be pre-compressed or compressed after the pre-mix has been poured over and before the pre-mix cures. The skeleton is typically compressed sufficiently so that, if it is multiple layers, it may take a set (permanently deforming, for example), in one embodiment. In another embodiment, the layers are simply pressed close to one another.

The preferred elastomer is a pliable, resilient, elastomeric, and sticky. A mix that will provide such an elastomer is the polyurethane referenced in the patents incorporated by reference. It forms a coherent body with the skeleton, coherent meaning that it flows between the skeletal openings like hundreds of small arms connecting to one another throughout the openings of the skeletal body.

In an uncompressed state, the gasket is typically in the range of about 20 mil to 100 mil thick (preferred about 50 to 100 mil (more preferred about 80 mil). When placed between the fuel door and the wing, the fuel door will be fastened, with a multiplicity of fasteners, and compress the gasket. Typically, the fuel door has a flat inner facing mating wall member having an outer perimeter. Opposed to that is a generally flat, outward facing mating wall having an inner perimeter, which is typically on or is part of the wing of an aircraft. The fuel access door is adapted, with multiple fasteners, to removably attach the wing so as to compress the gasket between the two facing walls.

In one embodiment, a torque of about 90 inch pounds is placed on ¼"-inch fasteners (MD-80 Fuel Access Door), which is typically sufficient to allow deformation of the gasket body (typically flowing out of the perimeter edges), and compression such that the metallic skeleton makes metal-to-metal contact between the two mating walls and between the multiple plies thereof.

In a compressed condition, the gasket may be between about 40 to 80% of pre-torque thickness, preferably about 50% but typically the compressed condition of the gasket is less than the pre-compression thickness of the skeleton. The thickness of the skeleton (measured before the mix is applied) may be in the range of about 20 to 22 mil preferred in one embodiment. The pressure on the gasket in a compressed condition between the fuel door and the aircraft wing may be in the range of about 1500 to 1900 psi, for example on the MD-80. In other embodiments, it may be about half this range.

The multiple layers of the skeleton may be comprised of a woven metallic mesh, a metallic fabric, an expanded metal knitted, chopped metal strands, or other suitable skeleton. The multiple layers comprising the skeleton may be separate layers (see FIG. 3A, for example), or they may be joined at their edges (see FIG. 2B, for example).

Compression may be used at several points in the method of making the gasket illustrated herein and in its method of use. In the method of making the gasket, in one embodiment, compression is applied to the metallic skeleton, before the application of the pre-cured polyurethane mix. Enough compression is applied to typically give some set to the metallic skeleton, such that when the pressure is released, it is not as thick as before the pressure was applied. In any of the steps set forth herein, this step can either be utilized or omitted. It typically assists in providing for a thinner gasket and one in which, in a multi-ply embodiment, has the plies laying closer to one another or even touching, before the pre-cured mix is applied.

The term "compression" is also used when, following the application of the pre-cured mix, pressure is applied, both to help squeeze out bubbles and to help bring the gasket into a thinner condition, this compression step is illustrated, in one example, in FIG. 8. This will also typically help bring out any entrained air bubbles from around and within the metallic skeleton.

After the gasket has been formed and the polyurethane cured, it may be removed from the mold or container. When placed between the retainer ring and the fuel access door, it will be compressed when the fuel access door is snugged down with fasteners. In doing so, there will be squeeze-out typically generated past the edges (as seen in FIG. 13). This may help with an environmental seal. Compression at this point is also sufficient to ensure metal-to-metal contact between the door and the retainer ring, through the metallic Skeleton.

While polyurethane is disclosed as a suitable material for the body of the gasket, any material that will affect a good environmental seal between the fuel door and the ring, with sufficient tac or stickiness so as to stick to the mating surfaces and flowability may be sufficient. Moreover, while Applicants' gel bodied gasket is illustrated in a preferred embodiment to be shaped and configured for use in sealing a fuel door to a retainer ring lip or other mating surface, the gasket and the methods of making the same as disclosed herein may be used in any aircraft embodiment or other embodiment where a good environmental seal is needed and where the gasket may be subject to a harsh environment, including temperature extremes and significant pressure differentials. Moreover, the gasket disclosed may be particularly used for, when a metallic skeleton is used, for EMI applications. The term "homogeneous" means substantially consistent physical and chemical properties throughout the gel body of the gasket.

Although the invention has been described with reference to a specific embodiment, this description is not meant to be construed in a limiting sense. On the contrary, various modifications of the disclosed embodiments will become apparent to those skilled in the art upon reference to the description of the invention. It is therefore contemplated that the appended claims will cover such modifications, alternatives, and equivalents that fall within the true spirit and scope of the invention.

The invention claimed is:

1. A gasket for use with a two piece aircraft part assemblies, each of the pieces having generally flat inner facing mating walls and outer perimeters in a pre-compressed state comprising:
   a partially open, flexible metallic skeleton being generally tabular in nature, the skeleton having a generally flat upper surface and a generally flat lower surface, an inner perimeter and an outer perimeter; and
   a pliable, resilient, elastomeric, sticky, substantially air bubble free, coherent, homogeneous, silicon-free polyurethane body, substantially filling the openings of the skeleton and being generally tabular in nature, the body being ring shaped having a generally flat, tacky upper surface, a generally flat, tacky lower surface, an inner perimeter wall, and an outer perimeter wall;
   wherein the outer perimeter walls of both the skeleton and the body generally conform to the shape defined by the outer perimeters of the aircraft parts assembly; and
   wherein the gasket is adapted to lay between the mating walls of the pieces and receive compression therebetween; and
   wherein the skeleton has multiple layers with the polyurethane body substantially filling the openings in the multiple layers;
   wherein the polyurethane body is resistant to Jet A fuel.

2. The gasket of claim 1, wherein the multiple tabular layers are joined at their edges and comprise concentric layers.

3. The gasket of claim 1, wherein the gasket is in an uncompressed state between about 30 and 100 mil thick.

4. The gasket of claim 1, wherein the gasket is between about 20 and 80 mil thick in a compressed state.

5. The gasket of claim 1, wherein in the compressed condition the gasket is about 40-80% of its uncompressed thickness.

6. The gasket of claim 1, wherein the pre-compression thickness of the skeleton is between about 15 and 30 mil and wherein the compression thickness of the gasket is at least pre-compression thickness of skeleton.

7. The gasket of claim 1, wherein the multiple layers comprise at least one of the following: woven metal, expanded metal, metallic mesh, or chopped metal.

8. The gasket of claim 7, wherein the at least one layer is comprised of either knitted aluminum or monel.

9. The gasket of claim 1, wherein the two pieces are any two aircraft pieces placed under compression.

10. The gasket of claim 9, wherein the two pieces are an aircraft antenna and the fuselage of an aircraft.

11. The gasket of claim 9, wherein the two pieces are a light fixture and the fuselage of an aircraft.

12. A method of making a gasket for use with a generally flat inner facing mating wall having an outer perimeter of a fuel access door and an opposed generally flat outward facing mating wall having an inner perimeter of a wing of an aircraft, the gasket having a porous, partially open metallic skeleton being generally tabular in nature and generally ring shaped, the skeleton having a generally flat upper surface and a generally flat lower surface, an inner perimeter wall and an outer perimeter wall; and a pliable, resilient, elastomeric, sticky, substantially air bubble free, homogeneous, coherent polyurethane body, substantially filling the openings of the skeleton and being generally tabular in nature, the body being ring shaped having a generally flat, tacky upper surface, a generally flat, tacky lower surface, an inner perimeter wall, and an outer perimeter wall; wherein the inner perimeter walls of both the skeleton and the body generally conform to the shape defined by the inner perimeter of the outward facing wall and wherein the outer perimeter walls of both the skeleton and the body generally conform to the shape defined by the outer perimeter of the fuel access door; and wherein the gasket is adapted to lay between the inner facing mating wall member and the outward facing mating wall member, the method comprising the steps of:
providing a mold in the shape of the skeleton to receive the skeleton therein;
selecting a polyurethane that will cure to form a sticky, pliable, resilient elastomer;
pouring a pre-cured polyurethane mix of the selected polyurethane in the mold to substantially cover the skeleton;
removing any air from the polyurethane mix; and
allowing the polyurethane mix to cure.

13. The method of claim 12, wherein the removal step is accomplished with vacuum.

14. The method of claim 13, wherein the vacuum is applied to the mold.

15. The method of claim 13, wherein the vacuum is applied to a vacuum chamber in which the mold is placed.

16. The method of claim 12, wherein the removal step is accomplished with compression.

17. The method of claim 12, wherein, prior to the pouring step, the skeleton is subject to compression.

18. The method of claim 12, wherein the skeleton is knitted.

19. A gasket for use with a two piece aircraft part assemblies, each of the pieces having generally flat inner facing mating walls and outer perimeters in a pre-compressed state comprising:
a partially open, flexible metallic skeleton being generally tabular in nature, the skeleton having a generally flat upper surface and a generally flat lower surface, an inner perimeter and an outer perimeter; and
a pliable, resilient, elastomeric, sticky, substantially air bubble free, coherent, homogeneous, silicon-free polyurethane body, substantially filling the openings of the skeleton and being generally tabular in nature, the body being ring shaped having a generally flat, tacky upper surface, a generally flat, tacky lower surface, an inner perimeter wall, and an outer perimeter wall;
wherein the outer perimeter walls of both the skeleton and the body generally conform to the shape defined by the outer perimeters of the aircraft parts assembly; and
wherein the gasket is adapted to lay between the mating walls of the pieces and receive compression therebetween;
wherein the skeleton has multiple layers with the polyurethane body substantially filling the openings in the multiple layers;
wherein the polyurethane body is resistant to Jet A fuel; and
wherein the multiple tabular layers are joined at their edges and comprise concentric layers; and
wherein the concentric layers are knitted.

20. A method of using a sealant with an aircraft fuel access panel assembly, the assembly having two parts, the two parts being aircraft parts, the method comprising the steps of:
providing a gasket, having a fuel resistant polyurethane body and a knitted mesh having multiple concentric tabular layers, that selectively adheres to one of the two parts of the assembly more readily than the second of the two parts of the assembly;
placing the two parts of the assembly together with the gasket assembly between the parts of the assembly;
first compressing the gasket between the two parts of the assembly;
repeatedly thermally cycling the assembly;
after thermally cycling, removing the one part of the assembly from the other with the gasket that will selectively adhere, maintain its integrity, and release cleanly from one of the two parts and, following the removing step;
replacing the two parts of the assembly together; and
second compressing of the gasket between the two parts of the assembly.

* * * * *